(12) United States Patent
Tung

(10) Patent No.: US 9,525,592 B2
(45) Date of Patent: Dec. 20, 2016

(54) CLIENT/SERVER NETWORK ENVIRONMENT SETUP METHOD AND SYSTEM

(71) Applicant: Wistron Corporation, New Taipei (TW)

(72) Inventor: Kuang-Hao Tung, New Taipei (TW)

(73) Assignee: Wistron Corporation, New Taipei (TW)

(*) Notice: Subject to any disclaimer, the term of this patent is extended or adjusted under 35 U.S.C. 154(b) by 399 days.

(21) Appl. No.: 14/078,533

(22) Filed: Nov. 13, 2013

(65) Prior Publication Data

US 2014/0337493 A1 Nov. 13, 2014

(30) Foreign Application Priority Data

May 9, 2013 (TW) .............................. 102116522 A

(51) Int. Cl.
*G06F 15/16* (2006.01)
*G06F 15/177* (2006.01)
*H04L 12/24* (2006.01)

(52) U.S. Cl.
CPC ....... *H04L 41/0806* (2013.01); *H04L 41/0876* (2013.01); *H04L 41/0879* (2013.01); *H04L 41/0883* (2013.01); *H04L 41/0886* (2013.01)

(58) Field of Classification Search
CPC ............. H04L 41/0806; H04L 41/0886; H04L 41/0876; H04L 41/0879; H04L 41/0883; H04L 41/08

(Continued)

(56) References Cited

U.S. PATENT DOCUMENTS 6,098,098 A * 8/2000 Sandahl ................ H04L 41/082
709/221
8,224,944 B2 * 7/2012 Odenwald ............. G06F 15/173
709/220

(Continued)

FOREIGN PATENT DOCUMENTS

| CN | 1595870 | 3/2005 |
|---|---|---|
| TW | 201207733 | 2/2012 |
| TW | 201239762 | 10/2012 |

OTHER PUBLICATIONS

"Office Action of Taiwan Counterpart Application," issued on Aug. 14, 2015, with English translation thereof, p. 1-p. 10.

*Primary Examiner* — Edward Kim
(74) *Attorney, Agent, or Firm* — Jianq Chyun IP Office

(57) ABSTRACT

A setup method of a client/server network environment is provided. The client/server network environment includes a controller node and a compute node. The controller node and the compute node are respectively predefined with a specific device function. In the method, a master node recording a plurality of components and a configuration file of each of the components is provided, and an Internet Protocol (IP) address is respectively assigned to the master node, the controller node, and the compute node. When the master node receives a setup request from a device to be set up between the controller node and the compute node, an auto-shell is generated according to the setup request and transmitted to the device to be set up. The auto-shell is executed by the device to be set up to automatically accomplish the setup for realizing the specific device function corresponding to the device to be set up.

16 Claims, 8 Drawing Sheets

(58) Field of Classification Search
USPC ....... 709/201, 202, 203, 208, 209, 220, 221, 709/222
See application file for complete search history.

(56) References Cited

U.S. PATENT DOCUMENTS

| | | | |
|---|---|---|---|
| 2003/0158886 A1* | 8/2003 | Walls | G06F 3/14 709/201 |
| 2004/0205772 A1 | 10/2004 | Uszok et al. | |
| 2008/0294759 A1* | 11/2008 | Biswas | H04L 41/04 709/222 |
| 2009/0187523 A1* | 7/2009 | D'Alo | B26B 19/14 706/47 |
| 2009/0307299 A1* | 12/2009 | Malesich | G06Q 10/10 709/202 |
| 2010/0064228 A1* | 3/2010 | Tsern | G06F 3/1415 715/740 |
| 2012/0215874 A1* | 8/2012 | Sequeira | H04L 12/12 709/208 |
| 2012/0246113 A1 | 9/2012 | Chen | |

* cited by examiner

| Function | Boolean Value | Related configuration value |
|---|---|---|
| OpenStack Controller | True | 192.168.1.51 |
| OpenStack Controller VM ip | True | 10.0.0.2/24 |
| OpenStack Controller token | True | Wiwynn |
| OpenStack Controller MySQL | True | Wiwynn |
| OpenStack Compute | False | |
| OpenStack Swift Storage | True | /dev/sda2:/dev/sda3 |
| OpenStack Swift Proxy Server | False | |

| Function | Boolean Value | Related configuration value |
|---|---|---|
| OpenStack Controller | False | |
| OpenStack Compute | True | 192.168.1.52 |
| OpenStack Controller ip | | 192.168.1.51 |
| OpenStack Controller MySQL ip | | 192.168.1.51 |
| OpenStack Controller Keystone | | 192.168.1.51 |
| OpenStack Controller Glance | | 192.168.1.51 |
| OpenStack Swift Storage | False | |
| OpenStack Swift Proxy Server | True | 192.168.1.52 |
| OpenStack Swift Proxy Storage ip | | 192.168.1.51: 192.168.1.53 |
| OpenStack Swift Proxy Zone | True | 3 |
| OpenStack Swift Proxy time | True | 100 |

| Function | Boolean Value | Related configuration value |
|---|---|---|
| OpenStack Controller | False | |
| OpenStack Compute | True | 192.168.1.53 |
| OpenStack Controller ip | | 192.168.1.51 |
| OpenStack Controller MySQL ip | | 192.168.1.51 |
| OpenStack Controller Keystone | | 192.168.1.51 |
| OpenStack Controller Glance | | 192.168.1.51 |
| OpenStack Swift Storage | True | /dev/sda3 |
| OpenStack Swift Proxy Server | False | |

CLIENT/SERVER NETWORK ENVIRONMENT SETUP METHOD AND SYSTEM

CROSS-REFERENCE TO RELATED APPLICATION

This application claims the priority benefit of Taiwan application serial no. 102116522, filed on May 9, 2013. The entirety of the above-mentioned patent application is hereby incorporated by reference herein and made a part of this specification.

BACKGROUND OF THE INVENTION

1. Field of the Invention

The present invention generally relates to an automatic setup method, and more particularly, to a method and a system for setting up a client/server network environment.

2. Description of Related Art

Cloud computing products have been increasingly accepted along with the development of the cloud computing technology. To increase the product layout, a manufacturer usually develops cloud computing products that meet both the manufacturer's expertise and the market demand by looking for niches in Infrastructure as a Service (IaaS), Platform as a Service (PaaS), and Software as a Service (SaaS).

For example, a cloud computing product manufacturer specializing in the research and development of servers, storage devices, and network equipments can increase the price/performance ratio of its cloud computing products by taking advantage of its hardware superiority if its cloud computing products are planned based on IaaS. This type of clouding computing companies usually set up and provide cloud computing services by using the cloud computing software OpenStack jointly developed by NASA and Rackspace Inc.

However, any cloud computing service has to be provided through a physical machine, and when the OpenStack software is adopted for providing a cloud computing service, each physical machine needs to be manually set up. Namely, an administrator needs to determine the components required by each physical machine and manually downloads and installs the required components. The administrator needs to understand the configuration file of each component very well in order to complete the complicated installation procedure. If there are a large number of physical machines, the setup of the physical machines will be very time and labor consuming, and it will be very inconvenient to add new physical machines dynamically.

SUMMARY OF THE INVENTION

Accordingly, the present invention is directed to a setup method and a setup system of a client/server network environment, in which the setup of each controller node or compute node in the client/server network environment can be quickly and automatically accomplished.

The present invention provides a setup method of a client/server network environment. The client/server network environment includes a controller node and a compute node. The controller node and the compute node are respectively predefined with a specific device function. The setup method includes providing a master node storing a plurality of components and a configuration file corresponding to each of the components and respectively assigning an Internet Protocol (IP) address to the master node, the controller node, and the compute node. The method also includes generating an auto-shell according to a setup request received by the master node from a device to be set up between the controller node and the compute node and transmitting the auto-shell to the device to be set up. The method further includes executing the auto-shell by the device to be set up to automatically accomplish a setup for realizing the specific device function corresponding to the device to be set up.

According to an embodiment of the present invention, the master node receives the setup request from the device to be set up when the device to be set up connects to the Internet.

According to an embodiment of the present invention, the setup request includes a configuration table, and the device to be set up generates the configuration table according to the predefined specific device function.

According to an embodiment of the present invention, after the step of respectively assigning the IP address to the master node, the controller node, and the compute node, the method further includes providing a file sharing mechanism between the master node and the controller node and compute node by the master node according to the IP addresses of the controller node and the compute node.

According to an embodiment of the present invention, the step of generating the auto-shell according to the IP address of the device to be set up and the setup request and transmitting the auto-shell to the device to be set up after the master node receives the setup request from the device to be set up includes following steps. When the setup request is completely received from the device to be set up, the configuration table is scanned. If the configuration table is not completely scanned, a scan error record is generated, and the device to be set up is allowed to obtain the scan error record through the file sharing mechanism. If the configuration table is completely scanned, the auto-shell is generated according to the configuration table, and whether the auto-shell is successfully transmitted to the device to be set up through the file sharing mechanism is determined. If the auto-shell is not successfully transmitted to the device to be set up, a transmission error record is generated, and the device to be set up is allowed to obtain the transmission error record through the file sharing mechanism.

According to an embodiment of the present invention, the step of executing the auto-shell by the device to be set up to automatically accomplish the setup of the specific device function corresponding to the device to be set up includes following steps. The auto-shell is executed to obtain at least one specific component for realizing the specific device function among the components stored in the master node through the file sharing mechanism, and/or the at least one specific component for realizing the specific device function is downloaded through an external network. The at least one specific component is automatically installed to the device to be set up.

According to an embodiment of the present invention, the auto-shell includes the configuration file of each of the at least one specific component, and the step of automatically installing the at least one specific component to the device to be set up includes executing an installation procedure of each of the at least one specific component according to the configuration file of each specific component.

According to an embodiment of the present invention, the client/server network environment is a cloud computing environment, and the specific device function predefined in the controller node is different from the specific device function predefined in the compute node.

The present invention provides a setup system of a client/server network environment. The setup system includes a controller node predefined with a first specific device function, a compute node predefined with a second specific device function, and a master node. The master node stores a plurality of components and a configuration file corresponding to each of the components. After the master node, the controller node, and the compute node are respectively assigned to an IP address, when the master node receives a setup request from a device to be set up between the controller node and the compute node, the master node generates an auto-shell according to the setup request and transmits the auto-shell to the device to be set up. The device to be set up executes the auto-shell to automatically accomplish a setup for realizing a specific device function corresponding to the device to be set up. The specific device function is the first specific device function or the second specific device function.

According to an embodiment of the present invention, the master node receives the setup request from the device to be set up when the device to be set up connects to the Internet.

According to an embodiment of the present invention, the setup request includes a configuration table, and the device to be set up generates the configuration table according to the predefined specific device function.

According to an embodiment of the present invention, the master node provides a file sharing mechanism between the master node and the controller node and compute node according to the IP addresses of the controller node and the compute node.

According to an embodiment of the present invention, after the master node receives the setup request from the device to be set up completely, the master node scans the configuration table. If the master node does not scan the configuration table completely, the master node generates a scan error record and allows the device to be set up to obtain the scan error record through the file sharing mechanism. If the master node scans the configuration table completely, the master node generates the auto-shell according to the configuration table and determines whether the auto-shell is successfully transmitted to the device to be set up through the file sharing mechanism. If the auto-shell is not successfully transmitted to the device to be set up, the master node generates a transmission error record and allows the device to be set up to obtain the transmission error record through the file sharing mechanism.

According to an embodiment of the present invention, the device to be set up executes the auto-shell to obtain at least one specific component for realizing the specific device function among the components stored in the master node through the file sharing mechanism and/or downloads the at least one specific component for realizing the specific device function through an external network, and the device to be set up automatically installs the at least one specific component to the device to be set up.

According to an embodiment of the present invention, the auto-shell includes the configuration file of each of the at least one specific component, and the device to be set up executes an installation procedure of each of the at least one specific component according to the configuration file of each specific component.

According to an embodiment of the present invention, the client/server network environment is a cloud computing environment, and the first specific device function is different from the second specific device function.

As described above, in the present invention, components and related configuration information required by a controller node and a compute node in a client/server network environment are shared through a master node, so that the controller node and the compute node can automatically obtain and install the desired components from the master node or an external network according to the predefined device functions thereof. Thereby, the controller node and the compute node need not to be manually configured and accordingly the controller node and the compute node can be quickly set up.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6, FIG. 7, and FIG. 8 are diagrams of configuration tables according to an embodiment of the present invention.

DESCRIPTION OF THE EMBODIMENTS

Figure 1:
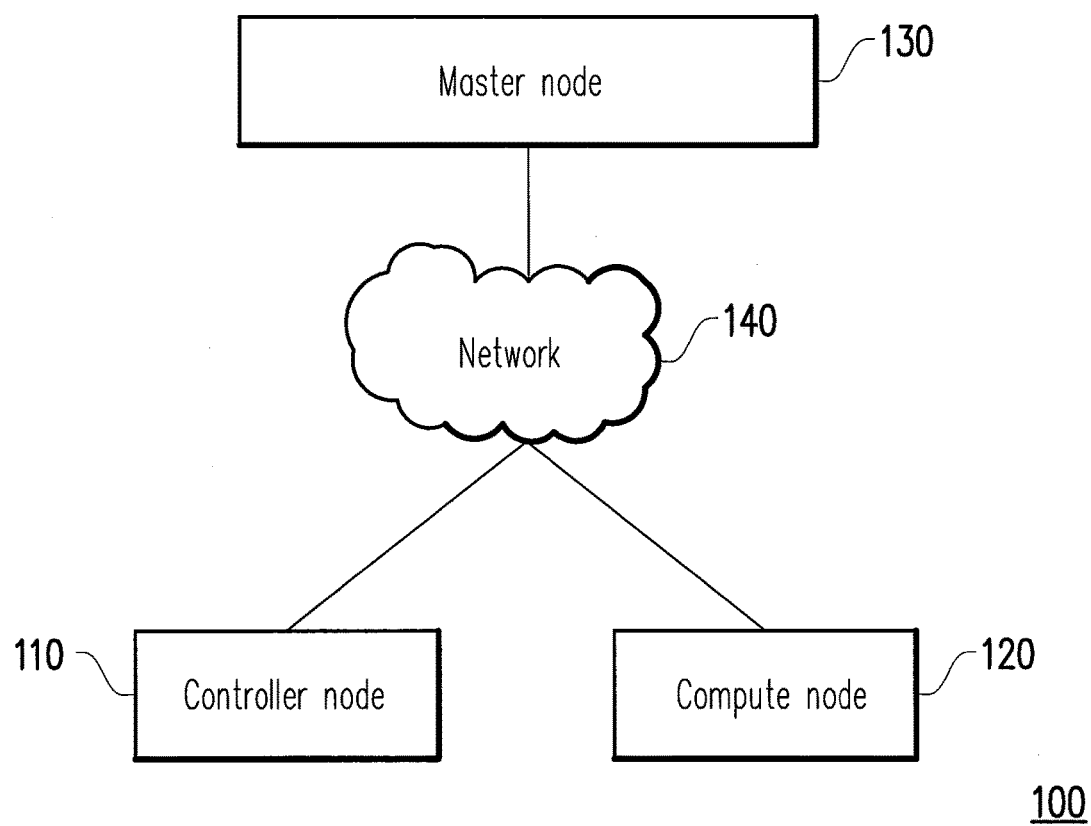
FIG. 1 is a block diagram of a setup system of a client/server network environment according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

A client/server network environment usually includes one or more controller nodes and one or more compute nodes. Each controller node controls the compute nodes according to its predefined device function, and each compute node carries out related operations according to its predefined device function. However, regardless of a controller node or a compute node, to realize the device function thereof, related components have to be installed and configured according to the role played by the node in the client/server network environment. To quickly and simply set up each controller node or compute node, the present invention provides a setup system and a setup method offering both quick installation and network environment integrity. In the present invention, a file sharing mechanism is provided through a master node such that components and related configuration information required for setting up different controller nodes and compute nodes can be shared. Besides, because the master node possesses all components required by the client/server network environment, manual file searching and configuration is not needed, and controller nodes and compute nodes of different device functions can always obtain the desired files from the master node. Below, embodiments of the present invention will be described in detail with reference to accompanying drawings.

FIG. 1 is a block diagram of a setup system of a client/server network environment according to an embodiment of the present invention. Referring to FIG. 1, the client/server network environment setup system 100 includes a controller node 110, a compute node 120, and a master node 130. The controller node 110 is predefined with a first specific device function, and the compute node 120 is predefined with a second specific device function, where the first specific device function is different from the second specific device function. In the present embodiment, the controller node 110, the compute node 120, and the master node 130 are physical machines (for example, computer systems, workstations, or servers, but not limited thereto) with network connection functions. Even though not shown in FIG. 1, the controller node 110, the compute node 120, and the master node 130 respectively have various hardware devices, such as a processor, a memory, a network device (for example, a network adapter), and a hard disc.

As shown in FIG. 1, the controller node 110, the compute node 120, and the master node 130 can transmit information to each other through a network 140. The network 140 is an external network, such as a local area network (LAN) or the Internet. In another embodiment, an internal network (not shown) exists between the controller node 110 and the compute node 120, and the controller node 110 can control the compute node 120 through the internal network. It should be noted that FIG. 1 simply illustrates an example for the convenience of description, and in other embodiments, the client/server network environment setup system 100 may include two or more controller nodes and/or two or more compute nodes, each controller node may be predefined with the same device function or different device functions, and each compute node may also be predefined with the same device function or different device functions.

Figure 2:
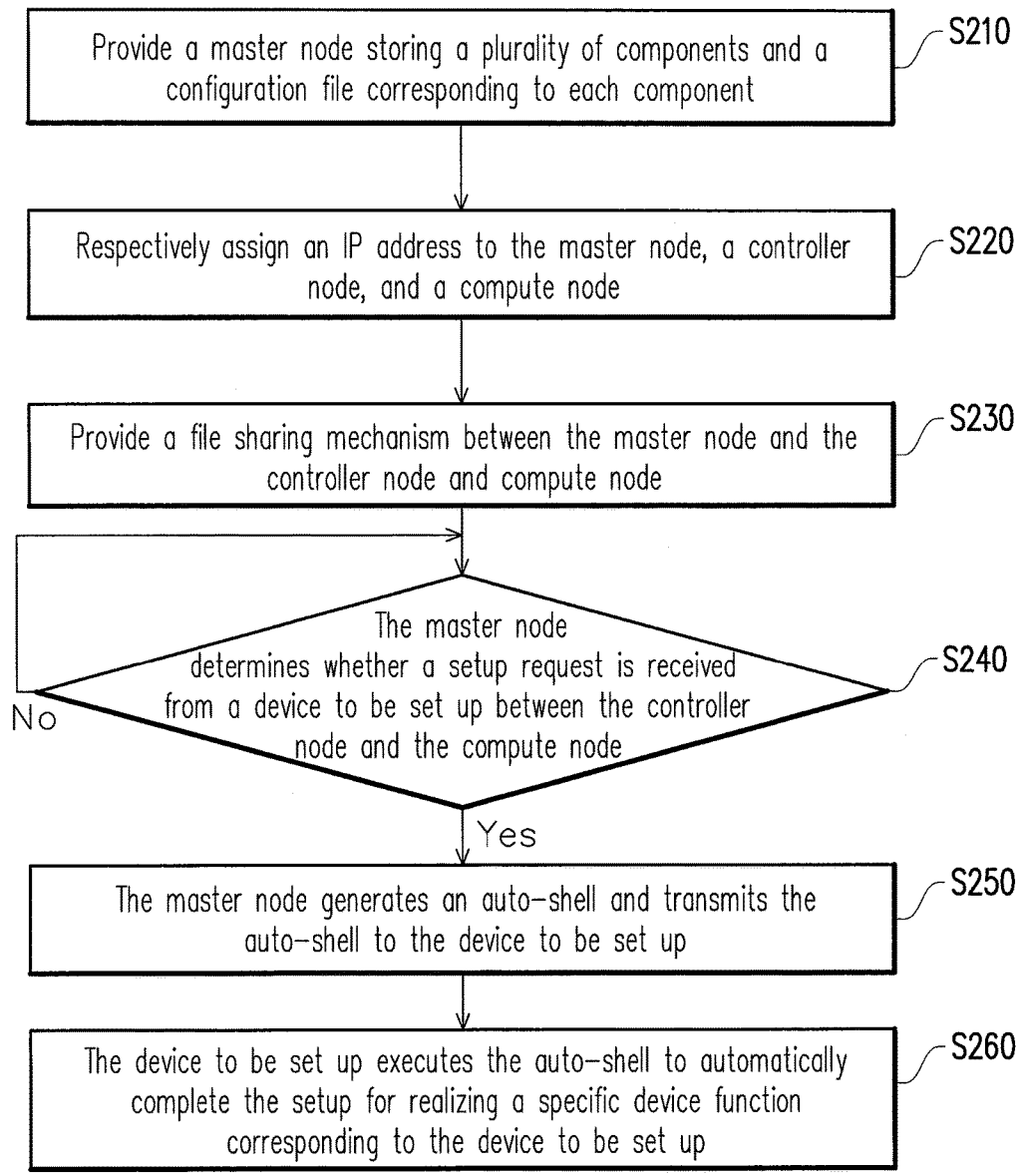
FIG. 2 is a flowchart of a setup method of a client/server network environment according to an embodiment of the present invention.

Below, the operation of the client/server network environment setup system 100 will be described in detail with reference to another embodiment of the present invention. FIG. 2 is a flowchart of a setup method of a client/server network environment according to an embodiment of the present invention. Please refer to both FIG. 1 and FIG. 2 regarding following descriptions.

First, in step S210, a master node 130 is provided according to the characteristics and requirements of the client/server network environment. To be specific, the master node 130 stores components required by various devices in the client/server network environment and configuration files respectively corresponding to the components. For example, if the client/server network environment is a cloud computing environment (for example, a cloud computing environment developed by using the OpenStack software), the components stored in the master node 130 may include a nova-schedule component for managing the boot sequence of virtual machines, a nova-network component for managing the network positions of virtual machines and physical machines, a nova-api component for managing data links of compute nodes and controller nodes, a nova-compute component for managing virtual machines, a nova-consoleauth component for managing virtual network computing (VNC) links of virtual machines, a nova-novncproxy component for managing VNC proxy server addresses of virtual machines, a swift-storage component for managing data storage positions, a swift-proxy component for managing swift proxy server addresses, a keystone component for managing user authentications, a glance component for managing image files, and a Mysql component for managing a database. The configuration file of each component is related to various configuration parameters and installation techniques of the component. However, the components listed above are only examples but not intended to limit the scope of the present invention.

Then, in step S220, an Internet Protocol (IP) address is respectively assigned to the master node 130, the controller node 110, and the compute node 120. Next, in step S230, the master node 130 provides a file sharing mechanism between the master node 130 and the controller node 110 and compute node 120 according to the IP addresses of the controller node 110 and the compute node 120. In an embodiment, the file sharing mechanism is based on the network file system (NFS). Namely, the controller node 110 and the compute node 120 can access resources shared by the master node 130 by mounting to the master node 130. To be specific, the master node 130 defines a partition in its hard disc (not shown), and the master node 130 and the controller node 110 and compute node 120 can store data into the partition to share the data by simply setting that data stored in the partition is accessible by the IP addresses of the controller node 110 and the compute node 120. However, the implementation of the file sharing mechanism is not limited in the present invention.

Next, in step S240, the master node 130 repeatedly determines whether a setup request is received from the controller node 110 or the compute node 120. To be specific, the controller node 110 or the compute node 120 generates a configuration table according to the predefined specific device function and sends a setup request including the configuration table when the controller node 110 or the compute node 120 is able to connect to the network 140 (for example, when a network cable is plugged). In the present embodiment, the configuration table includes a function field, a Boolean value field, and a related configuration value field. The function field records the name of a component, the Boolean value field records whether a specific device function is related to the corresponding component, and the related configuration value field records information related to the corresponding component. The content of each field can be a default value or filled up by a user according to the specific device functions of the controller node 110 and the compute node 120. For example, in the same client/server network environment, configuration tables have the same or similar formats, and a user can fill up a configuration table by slightly modifying or adding/removing contents in the configuration table according to different specific device functions.

For the convenience of description, the controller node 110 or compute node 120 issuing the setup request will be referred to as a device to be set up thereinafter. Namely, the master node 130 receives the setup request from the device to be set up when the device to be set up connects to the network 140. It should be mentioned that if the master node 130 does not completely receive the setup request from the device to be set up, the master node 130 generates a request error record and allows the device to be set up to obtain the request error record through the file sharing mechanism. In an embodiment, the device to be set up issues a setup request again once it obtains the request error record. In another embodiment, the device to be set up re-issues a setup request only when the number of request error records received by the device to be set up is smaller than a predetermined value (for example, 5, but not limited thereto in the present invention).

When the master node 130 receives a setup request from the device to be set up, in step S250, the master node 130 generates an auto-shell according to the setup request and transmits the auto-shell to the device to be set up through the file sharing mechanism. In next step S260, the device to be set up executes the auto-shell to automatically accomplish the setup for realizing the specific device function corresponding to the device to be set up.

As shown in FIG. 2, as long as the device to be set up can connect to the network 140, the master node 130 can generate the auto-shell according to the setup request issued by the device to be set up, and after the device to be set up receives the auto-shell through the file sharing mechanism, the setup of the specific device function can be automatically accomplished.

It should be mentioned that even though in the embodiment described above, one of the controller node 110 and the compute node 120 is considered the device to be set up, in other embodiments, the master node 130 may receive and process setup requests from multiple devices to be set up. The technique adopted by the master node 130 for processing each of the multiple setup requests is similar therefore will not be described herein.

Below, step S250 and step S260 in FIG. 2 will be further explained with reference to FIG. 3 and FIG. 4.

Figure 3:
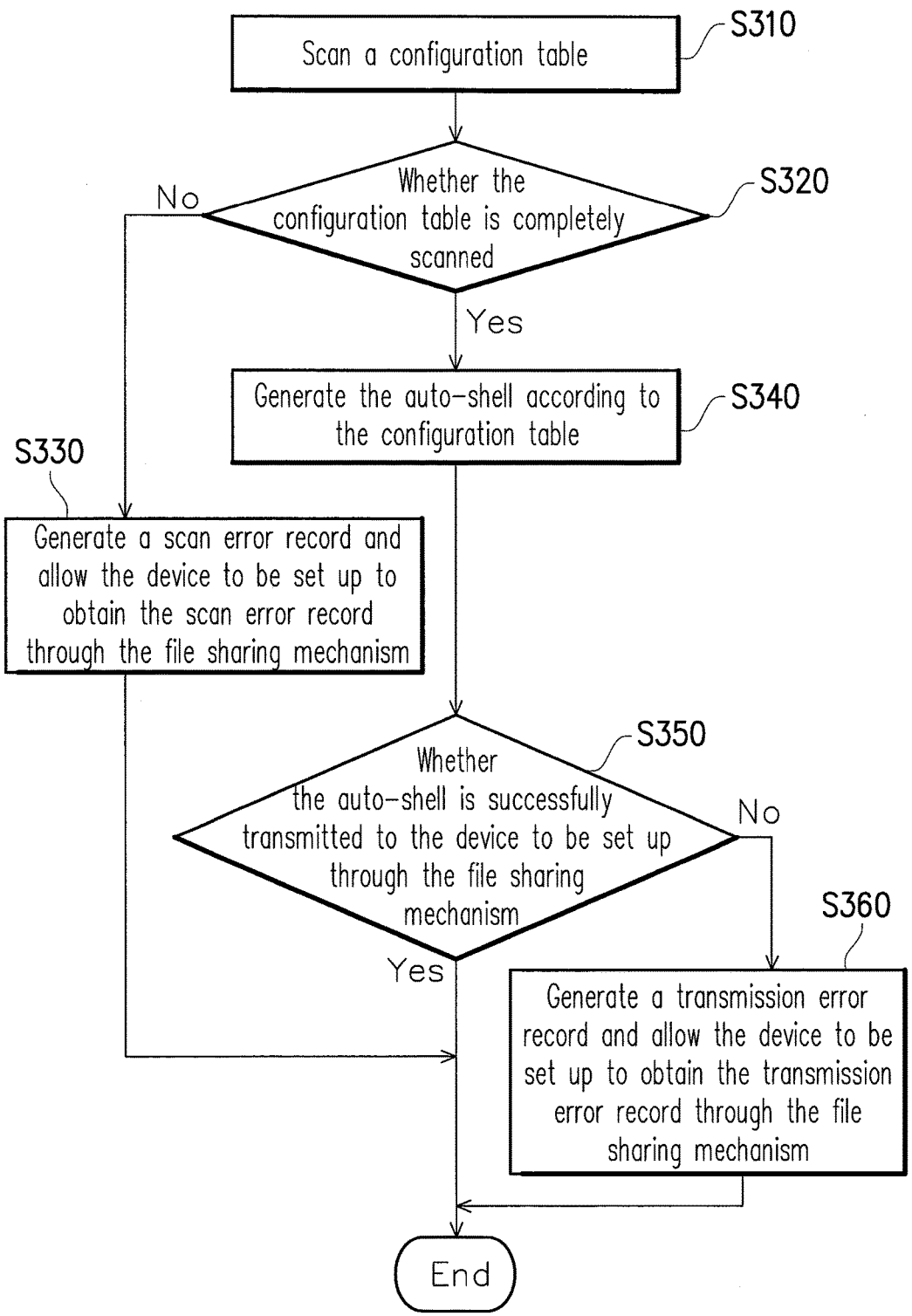
FIG. 3 is a flowchart illustrating how an auto-shell is generated and transmitted according to an embodiment of the present invention.
Figure 4:
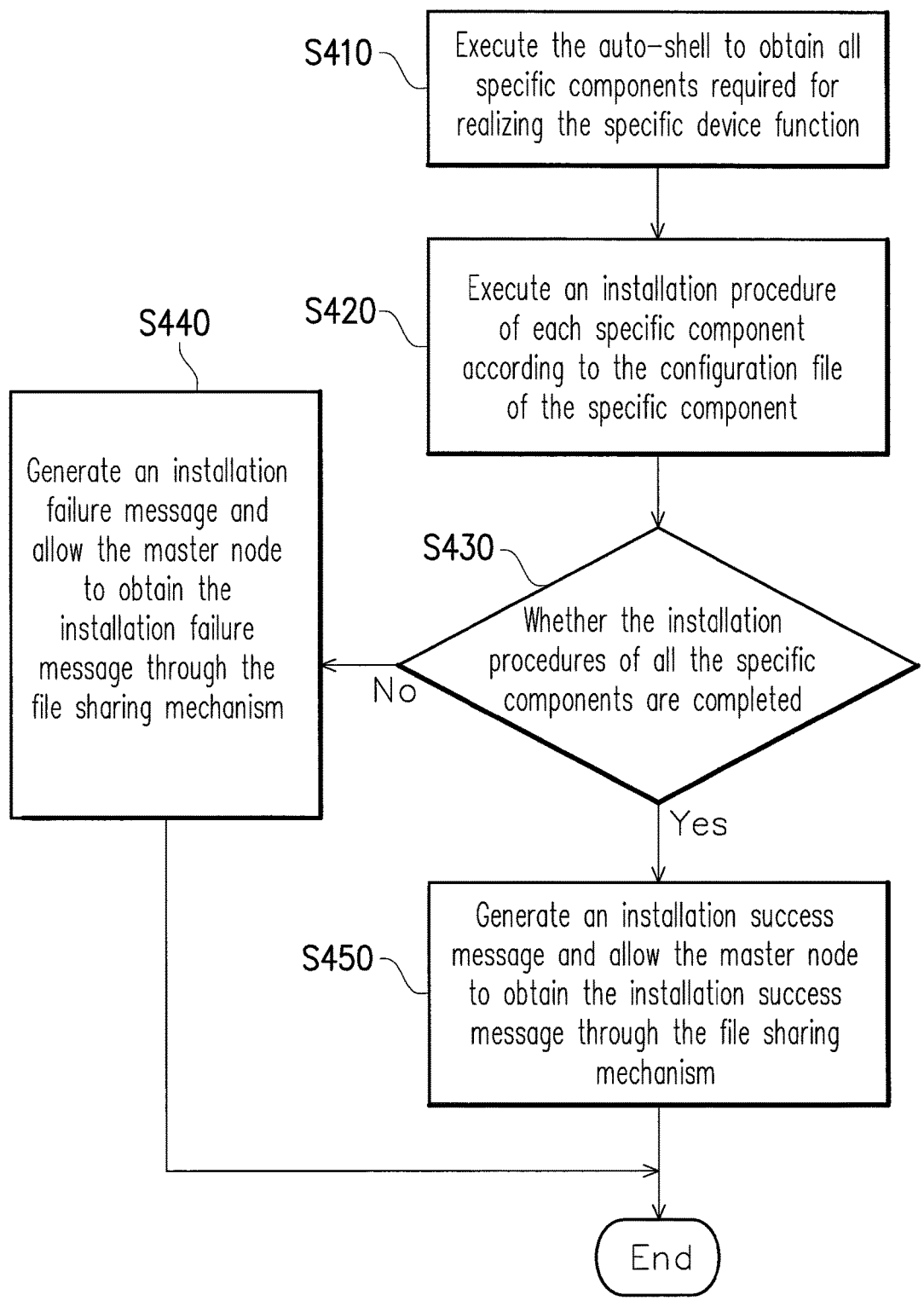
FIG. 4 is a flowchart illustrating how an auto-shell is executed to automatically accomplish a setup according to an embodiment of the present invention.

FIG. 3 is a flowchart illustrating the operation of a master node according to an embodiment of the present invention. Referring to FIG. 3, after the master node 130 receives a setup request from the device to be set up, in step S310, the master node 130 scans the configuration table in the setup request, and in step S320, the master node 130 determines whether the configuration table is completely scanned.

If the configuration table cannot be completely scanned, in step S330, the master node 130 generates a scan error record and allows the device to be set up to obtain the scan error record through the file sharing mechanism. For example, the master node 130 stores the scan error record into the partition it shares with the controller node 110 and the compute node 120, so that the controller node 110 or the compute node 120 that is considered the device to be set up can obtain the scan error record from the partition.

If the configuration table is completely scanned, in step S340, the master node 130 generates the auto-shell according to the configuration table. In the present embodiment, the auto-shell includes the name, the original location, and the configuration file of each specific component required for setting up the device to be set up. The master node 130 may store the auto-shell into the partition it shares with the controller node 110 and the compute node 120, so that the controller node 110 or the compute node 120 that is considered the device to be set up can obtain the auto-shell from the partition.

In next step S350, the master node 130 determines whether the auto-shell is successfully transmitted to the device to be set up through the file sharing mechanism. If an error occurs during the sharing procedure, in step S360, the master node 130 generates a transmission error record and allows the device to be set up to obtain the transmission error record through the file sharing mechanism. For example, the master node 130 stores the transmission error record into the partition it shares with the controller node 110 and the compute node 120, so that the controller node 110 or the compute node 120 that is considered the device to be set up can obtain the transmission error record from the partition.

Below, the operation of the device to be set up after the auto-shell is received will be explained with reference to FIG. 4.

First, in step S410, the device to be set up executes the auto-shell to obtain all the specific components required for realizing the specific device function. In an embodiment, the device to be set up obtains the specific components among all the components stored in the master node 130. In another embodiment, the device to be set up downloads one or more specific components for realizing the specific device function through an external network (for example, the network 140). In yet another embodiment, the device to be set up downloads all the specific components for realizing the specific device function from both the master node 130 and the external network.

Then, in step S420, the device to be set up obtains the configuration file of each specific component from the auto-shell and executes an installation procedure of each specific component accordingly. For example, the device to be set up sets the parameters of a specific component and executes the installation procedure according to the content of the configuration file. Next, in step S430, the device to be set up determines whether the installation procedures of all the specific components have been completed.

If the device to be set up is re-started or a network interruption occurs when the specific components are automatically installed, the installation procedure of one or more specific components may not be completed. Thus, in step S440, the device to be set up generates an installation failure message and allows the master node 130 to obtain the installation failure message through the file sharing mechanism. On the other hand, if the device to be set up completes the installation procedures of all the specific components, in step S450, the device to be set up generates an installation success message and allows the master node 130 to obtain the installation success message through the file sharing mechanism.

As described in foregoing embodiment, the user simply fills up the configuration table according to the predefined specific device functions of the controller node 110 and the compute node 120, and once the controller node 110 and the compute node 120 connect to the network 140, the master node 130 can control the controller node 110 and/or the compute node 120 to automatically complete the installation procedures of all the desired components by generating and transmitting the auto-shell. Thereby, the controller node 110 and/or the compute node 120 can be quickly set up.

Figure 5:
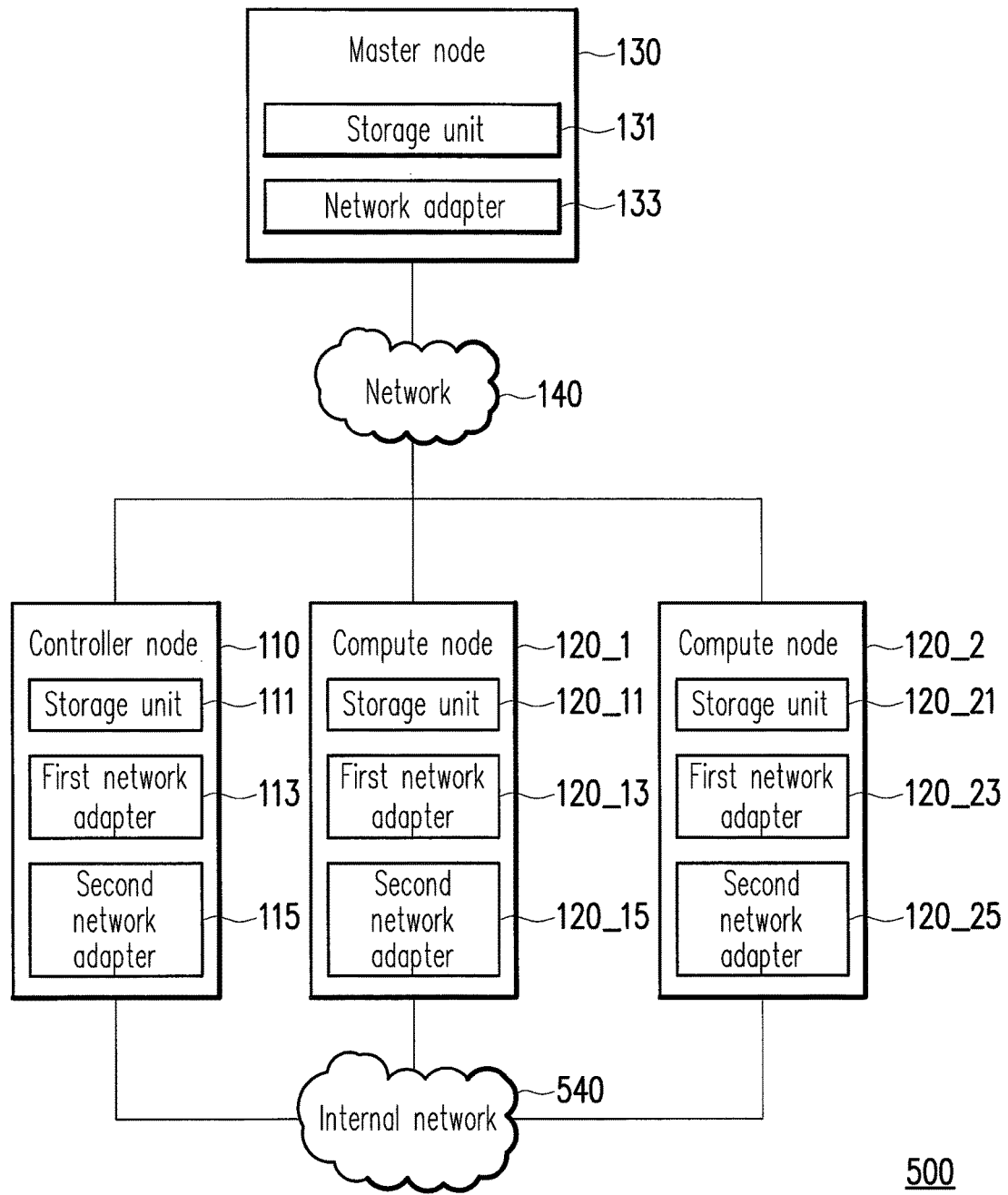
FIG. 5 is a block diagram of a setup system of a client/server network environment according to another embodiment of the present invention.

FIG. 5 is a block diagram of a setup system of a client/server network environment according to another embodiment of the present invention. Referring to FIG. 5, the client/server network environment setup system 500 includes a controller node 110, a compute node 120_1, a compute node 120_2, and a master node 130. In the present embodiment, the client/server network environment to which the client/server network environment setup system 500 is adapted is a cloud computing environment developed by using the OpenStack software, where the controller node 110 is a control device in the cloud computing environment and configured to run network, volume management, application programming interface (API), scheduler, and image services, and the compute node 120_1 and the compute node 120_2 are compute devices in the cloud computing environment and configured to run virtual instances.

The controller node 110 includes a storage unit 111, a first network adapter 113, and a second network adapter 115. The specific device function of the controller node 110 is predefined as OpenStack object storage (Swift). The compute node 120_1 includes a storage unit 120_11, a first network adapter 120_13, and a second network adapter 120_15, and the specific device function of the compute node 120_1 is predefined as a Swift proxy server. The compute node 120_2 includes a storage unit 120_21, a first network adapter 120_23, and a second network adapter 120_25, and the specific device function thereof is predefined as Swift.

The master node 130 includes a storage unit 131 and a network adapter 133. The master node 130 defines a shared partition in the storage unit 131 based on the concept of NFS and sets the shared partition as a space it shares with the controller node 110, the compute node 120_1, and the compute node 120_2. The master node 130 provides a file sharing mechanism between itself and the controller node 110, the compute node 120_1, and the compute node 120_2 through the shared partition In the present embodiment, the controller node 110, the compute node 120_1, the compute node 120_2, and the master node 130 respectively connect to an external physical network 140 (for example, a LAN) through the first network adapter 113, the first network adapter 120_13, the first network adapter 120_23, and the network adapter 133. The controller node 110, the compute node 120_1, and the compute node 120_2 respectively access an internal network 540 through the second network adapter 115, the second network adapter 120_15, and the second network adapter 120_25, so as to allow virtual instances to communicate with and transmit information to each other through the internal network 540.

Below, how the controller node 110, the compute node 120_1, and the compute node 120_2 are controlled to automatically complete the setups for realizing their specific device functions through the operation of the master node 130 will be explained.

First, the storage unit 131 of the master node 130 stores all the components and the configuration file of each component required by the cloud computing environment developed by using the OpenStack software. FIG. 6, FIG. 7, and FIG. 8 are respectively diagrams of configuration tables of the controller node 110, the compute node 120_1, and the compute node 120_2. Taking the configuration table 600 in FIG. 6 as an example, the function field thereof records 7 components (i.e., Openstack Controller, OpenStack Controller VM ip, Openstack Controller token, OpenStack Controller MySQL, OpenStack Compute, OpenStack Swift Storage, and OpenStack Swift Proxy Server), and these 7 components will be respectively explained below.

The Boolean value field corresponding to the Openstack Controller component records "True", which means the configuration table 600 is for the controller node 110 but not for the compute node 120_1 or the compute node 120_2 (accordingly, the Boolean value field corresponding to the OpenStack Compute component records "False"). Besides, the related configuration value field corresponding to the Openstack Controller component records the IP address (i.e., "192.168.1.51") of the controller node 110 in the network 140.

The Boolean value field corresponding to the OpenStack Controller VM ip component records "True" (which means the configuration table 600 is for the controller node 110), and the related configuration value field records the IP address of the controller node 110 in the internal network 540 (i.e., "10.0.0.2/24").

Because the controller node 110 needs to perform authentication by using accounts and passwords, the Boolean value fields corresponding to the Openstack Controller token component and the OpenStack Controller MySQL component record "True", and the corresponding related configuration value fields record the password information.

The Boolean value field corresponding to the OpenStack Swift Storage component records "True" (which means the controller node 110 needs to access data by using this component), and the related configuration value field records the position of the data to be accessed. Additionally, because the predefined specific device function of the controller node 110 is not a Swift proxy server, the Boolean value field corresponding to the OpenStack Swift Proxy Server component records "False".

The contents of the configuration tables 700 and 800 are respectively corresponding to the specific device functions of the compute node 120_1 and the compute node 120_2 and can be understood by referring to foregoing descriptions related to the configuration table 600 therefore will not be described herein. However, it should be mentioned that after a first configuration table is completed, if new devices (for example, a controller node and/or a compute node) are to be added, the existing configuration table can be copied into the newly added devices, and the content thereof can be updated according to the specific device functions of the newly added devices. Namely, new devices can be conveniently added.

In the present embodiment, the IP addresses respectively corresponding to the media access control (MAC) addresses of the first network adapter 113, the first network adapter 120_13, and the first network adapter 120_23 can be constructed by setting up a dynamic host configuration protocol (DHCP) server at the master node 130. Thus, after the controller node 110, the compute node 120_1, and the compute node 120_2 connect to the network 140, the master node 130 generates the auto-shell according to the configuration tables in the setup requests respectively issued by the controller node 110, the compute node 120_1, and the compute node 120_2.

Taking the controller node 110 as an example, the master node 130 writes the MAC address of the first network adapter 113 of the controller node 110 into the DHCP server first, and at the same time when the controller node 110 requires an IP address, generates an auto-shell for the controller node 110 according to the configuration table in the setup request. The master node 130 stores the auto-shell into the shared partition of the storage unit 131. Then, the controller node 110 obtains the auto-shell from the shared partition and executes the auto-shell to obtain all the desired specific components (obtained from the master node 130 and/or downloaded through the network 140). After that, the controller node 110 executes the installation procedures to complete the automatic setup of the controller node 110. The automatic setups of the compute node 120_1 and the compute node 120_2 are similar to that of the controller node 110 described above therefore will not be described herein.

In the embodiment described above, the master node 130 controls the quickly setup of the client/server network environment to allow the controller node 110, the compute node 120_1, and the compute node 120_2 to automatically obtain the desired components and complete the corresponding installation procedures. Thus, the controller node 110, the compute node 120_1 and the compute node 120_2 need not to be manually set up one by one.

As described above, in a method and a system provided by the present invention for setting up a client/server network environment, the installation procedures of components required by all the controller nodes and compute nodes in the client/server network environment are automatically completed through simple configurations. Thus, by adopting the method and system provided by the present invention for setting up a client/server network environment, even there are a large number of controller nodes and compute nodes, when later on new devices are to be added or the functions of existing devices need to be updated, the desired components and corresponding installation operations can be quickly and automatically accomplished according to the role played by each device. Thereby, the time for setting up the client/server network environment is greatly shortened.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A setup method of a client/server network environment, wherein the client/server network environment comprises a controller node and a compute node, and the controller node and the compute node are respectively predefined with a specific device function, the setup method comprising:
    providing a master node, wherein the master node stores a plurality of components and a configuration file corresponding to each of the components;
    respectively assigning an Internet Protocol (IP) address to the master node, the controller node, and the compute node;
    providing, by the master node, a file sharing mechanism between the master node and the controller node and the compute node according to the IP addresses of the controller node and the compute node;
    after the master node receives a setup request from a device to be set up of the controller node or the compute node, generating an auto-shell according to the setup request, and transmitting the auto-shell to the device to be set up,
    wherein the setup request comprises a configuration table, and the device to be set up generates the configuration table according to the specific device function which is predefined in the device to be set up;
    executing the auto-shell by the device to be set up to automatically download at least one specific component from one of the master node and an external network according to the auto-shell; and
    after downloading the at least one specific component, installing the at least one specific component to the device to be set up by the device to be set up in order to accomplish a setup for realizing the specific device function corresponding to the device to be set up,
    wherein the step of generating the auto-shell according to the IP address of the device to be set up and the setup request and transmitting the auto-shell to the device to be set up after the master node receives the setup request from the device to be set up comprises:
        when the setup request is completely received from the device to be set up, scanning the configuration table;
        when an error is occurred during scanning the configuration table, generating a scan error record indicating that the error is occurred during scanning the configuration table and allowing the device to be set up to obtain the scan error record through the file sharing mechanism; and
        when the configuration table is completely scanned, generating the auto-shell according to the configuration table.

2. The method according to claim 1, wherein the master node receives the setup request from the device to be set up when the device to be set up connects to an Internet.

3. The method according to claim 1, wherein
    when the configuration table is completely scanned, after the step of generating the auto-shell according to the configuration table, further comprises:
    determining whether the auto-shell is successfully transmitted to the device to be set up through the file sharing mechanism; and
    when the auto-shell is not successfully transmitted to the device to be set up, generating a transmission error record, and allowing the device to be set up to obtain the transmission error record through the file sharing mechanism.

4. The method according to claim 3 further comprising:
    when an error is occurred during the master node receiving the setup request from the device to be set up, generating a request error record by the master node, and allowing the device to be set up to obtain the request error record through the file sharing mechanism.

5. The method according to claim 1, wherein the step of executing the auto-shell by the device to be set up to automatically install the at least one specific component to the device to be set up according to the auto-shell in order to accomplish the setup for realizing the specific device function corresponding to the device to be set up comprises:
    executing the auto-shell to obtain the at least one specific component for realizing the specific device function among the components stored in the master node through the file sharing mechanism, and/or downloading the at least one specific component for realizing the specific device function through an external network; and
    automatically installing the at least one specific component to the device to be set up.

6. The method according to claim 5, wherein the auto-shell comprises the configuration file of each of the at least one specific component, and the step of automatically installing the at least one specific component to the device to be set up comprises:
    for each of the at least one specific component, executing an installation procedure of the specific component according to the configuration file of the specific component.

7. The method according to claim 6, wherein after the step of automatically installing the at least one specific component to the device to be set up, the method further comprises:
    when the installation procedure of each of the at least one specific component is completed, generating a installation success message by the device to be set up, and allowing the master node to obtain the installation success message through the file sharing mechanism; and
    when the installation procedure of one of the at least one specific component is not completed, generating a installation failure message by using the device to be set up, and allowing the master node to obtain the installation failure message through the file sharing mechanism.

8. The method according to claim 1, wherein the client/server network environment is a cloud computing environment, and the specific device function predefined in the controller node is different from the specific device function predefined in the compute node.

9. A setup system of a client/server network environment, comprising:
a controller node, predefined with a first specific device function;
a compute node, predefined with a second specific device function; and
a master node, storing a plurality of components and a configuration file corresponding to each of the components,
wherein after the master node, the controller node, and the compute node are respectively assigned to an Internet Protocol (IP) address, wherein the master node provides a file sharing mechanism between the master node and the controller node and the compute node according to the IP addresses of the controller node and the compute node,
when the master node receives a setup request from a device to be set up of the controller node or the compute node, the master node generates an auto-shell according to the setup request and transmits the auto-shell to the device to be set up, wherein the setup request comprises a configuration table, and the device to be set up generates the configuration table according to the specific device function which is predefined in the device to be set up,
the device to be set up executes the auto-shell to automatically download at least one specific component from one of the master node and an external network according to the auto-shell,
after downloading the at least one specific component, the device to be set up installs the at least one specific component to the device to be set up in order to accomplish a setup for realizing a specific device function corresponding to the device to be set up, wherein the specific device function is the first specific device function or the second specific device function,
wherein when the master node completely receives the setup request from the device to be set up, the master node scans the configuration table,
when an error is occurred during scanning the configuration table, the master node generates a scan error record indicating that the error is occurred during scanning the configuration table and allows the device to be set up to obtain the scan error record through the file sharing mechanism,
when the configuration table is completely scanned, the master node generates the auto-shell according to the configuration table.

10. The system according to claim 9, wherein the master node receives the setup request from the device to be set up when the device to be set up connects to an Internet.

11. The system according to claim 9, wherein
after the operation of the master node generates the auto-shell according to the configuration table,
the master node determines whether the auto-shell is successfully transmitted to the device to be set up through the file sharing mechanism,
when the auto-shell is not successfully transmitted to the device to be set up, the master node generates a transmission error record and allows the device to be set up to obtain the transmission error record through the file sharing mechanism.

12. The system according to claim 11, wherein when an error is occurred during the master node receiving the setup request from the device to be set up, the master node generates a request error record and allows the device to be set up to obtain the request error record through the file sharing mechanism.

13. The system according to claim 9, wherein the device to be set up executes the auto-shell to obtain the at least one specific component for realizing the specific device function among the components stored in the master node through the file sharing mechanism and/or downloads the at least one specific component for realizing the specific device function through an external network, and the device to be set up automatically installs the at least one specific component to the device to be set up.

14. The system according to claim 13, wherein the auto-shell comprises the configuration file corresponding to each of the at least one specific component, and the device to be set up executes an installation procedure of each of the at least one specific component according to the configuration file of each of the at least one specific component.

15. The system according to claim 14, wherein when the device to be set up completes the installation procedure of each of the at least one specific component, the device to be set up generates an installation success message and allows the master node to obtain the installation success message through the file sharing mechanism,
When the device to be set up does not complete the installation procedure of one of the at least one specific component, the device to be set up generates an installation failure message and allows the master node to obtain the installation failure message through the file sharing mechanism.

16. The system according to claim 9, wherein the client/server network environment is a cloud computing environment, and the first specific device function is different from the second specific device function.

* * * * *